United States Patent Office 3,296,164
Patented Jan. 3, 1967

3,296,164
LUBRICANT ADDITIVE COMPRISING A BITU-MEN-ACRYLATE POLYMERIZATION PRODUCT
Ernst Koch, Traisa, Darmstadt, Wilhelm Rosskopp, Darmstadt, and Heinz Jost, Messel, Darmstadt, Germany, assignors to Röhm & Haas G.m.b.H., Darmstadt, Germany
No Drawing. Filed Feb. 9, 1962, Ser. No. 172,111
Claims priority, application Germany, Feb. 15, 1961, R 29,678
12 Claims. (Cl. 260—28)

This invention relates to lubricant additives and to methods of making the same.

The improvement of the viscosity-temperature relationship of mineral and synthetic lubricating oils by the addition thereto of certain oil-soluble polymers is known in the art. For example, polyacrylate or polymethacrylate polymers whose aliphatic alcohol components contain on the average at least 8 carbon atoms have been employed for this purpose. The preparation of such products is described in U.S. Patents 2,100,993 and 2,125,885, for example, which patents are incorporated herein by reference.

It is also known that the detergent effect of lubricant additives of this kind can be improved by incorporating into the polymer a compound containing a basic tertiary amino group, in which the compound tertiary amino nitrogen is a member of a heterocyclic ring and the polymerizable ethylenic double bond is outside the ring, but directly adjacent thereto (cf. German Patent 947,186). Those copolymers containing N-vinyl-2-pyrrolidone as the heterocyclic nitrogen compound have proved to be specially advantageous. Copolymers of this type, used as lubricant additives, inhibit the formation of oil sludge. The achievement of the same goal is also of great practical significance in fuel oils, as well as in lubricating oils.

It has now been found that lubricating oil and fuel oil additives which, in addition to achieving a good viscosity-temperature relationship also exhibit an outstanding dispersing effect, can be prepared by adding bitumen (asphalt, mineral pitch), or a bitumen-containing product, or bitumen in combination with a suitable solubilizing agent, to higher acrylate ester monomers or monomer mixtures before polymerizing the monomer or monomers according to procedures conventional in the prior art, e.g. heating at temperatures between 50° C. and 150° C. in the presence of 0.05 to 5 percent of a free-radical forming catalyst such as organic or inorganic peroxides, azo compounds, etc. The joint use of minor amounts of further monomers copolymerizable with a major portion of the higher acrylate esters, such as styrene, ethylacrylate, methylmethacrylate, glycol monomethacrylate, methacrylamide, and their substitution products such as acrylonitrile, vinyl acetate, and the like, can also be of advantage in the preparation of the new lubricant additives.

By higher "acrylate" esters herein is meant those esters of acrylic acid and lower alkylacrylic acids such as methacrylic acid which have an alcohol moiety containing more than 8, preferably 12–18 carbon atoms.

By "bitumen" herein is meant those dark, semi-fluid to solid substances, also called "asphalt" or "mineral pitch," which are found in nature and which are complex mixtures of hydrocarbons and oxygen- and/or sulfur-containing compounds. Comparable organic compounds are present in certain petroleum oils and can be obtained from these in a manner known in the art.

Bitumen is insoluble in most of the higher acrylate esters, but can be dispersed in the fluid to be polymerized with the aid of a suitable solubilizing agent. Such solubilizing compounds as have a sufficient solubilizing activity for bitumen and are also copolymerizable in minor amounts up to about 50% with a major portion of said acrylate esters can be used to special advantage. As examples of such compounds, isobutylmethacrylate and oleylmethacrylate can be mentioned. No particulars of the mechanism of the process by which the bitumen is incorporated into the polymer can be given, however, it is definite that in the preparation of the additives of the invention no mere physical mixture of the polymer and the bitumen is formed, but rather that the bitumen in chemically incorporated into the macromolecular compound. A simple admixture of bitumen to an already-formed acrylate polymer or to a lubricant oil containing such a polymer does not improve the detergent effect of the polymeric additive.

The amounts in which bitumen is incorporated into the polymer can vary between wide limits depending on the nature of the oil to be improved and to the ultimate intended use of the oil, and may vary, for example, from between 0.1 to 25% by weight, caluculated on the quantity of polymeric oil additive. Bitumen can be used in an amount between 0.5 and 10% by weight with special advantage. Since, in general, between 1 and 10% by weight of a lubricant oil additive is usually dissolved in a lubricant oil to be improved, a lubricating oil improved with the additives prepared according to the present invention generally contains 0.005 to 1.0% by weight of bitumen. These amounts are so small that they barely affect the intrinsic color of the lubricating oil. In most cases, even smaller quantities of the additive will improve the dispersibility of contaminants in heating oils.

In many cases it is advantageous to incorporate a compound containing a basic tertiary amino nitrogen as a member of a heterocyclic ring into the copolymer of the invention. In the following summary, such copolymers and the effects obtained therewith are disclosed. The results show that additions of even as little as 4% of such a heterocyclic compound, calculated upon the weight of the mixture of monomer and bitumen, is sufficient to achieve an outstanding dispersing effect. In the results shown, N-vinyl-2-pyrrolidone was used as the polymerizable nitrogen-containing heterocyclic compound, but similar effects are obtained by the use of other heterocyclic materials such as those disclosed in German patent 1,003,896, incorporated herein by reference.

A number of polymer additives are compared in the following Table 1 by evaluation of their dispersing effect in a lubricating oil according to several different techniques, as well as by determination of the viscosity index of the oil, calculated from viscosities at different temperatures.

Products 1–8 contained the following weight percent of polymerized components:

| Component | Sample No. | | | | | | | |
|---|---|---|---|---|---|---|---|---|
| | (1) | (2) | (3) | (4) | (5) | (6) | (7) | (8) |
| Bitumen | 10 | 10 | 2 | 2 | 0.5 | 2 | | |
| "Lorol" methacrylate ($C_{12}$–$C_{18}$ methacrylate esters) | 68 | 67.5 | 84 | 84 | 85.5 | 84 | 100 | 96 |
| Oleyl methacrylate | 10 | 10 | | | | | | |
| Methyl methacrylate | 10 | 10 | 10 | 10 | 10 | 10 | | |
| Glycol monomethacrylate | 2 | 2.5 | | | | | | |
| N-vinyl-2-pyrrolidone | | | 4 | 4 | 4 | 4 | | 4 |

(1) Polymerized at 110° C. with 2.5 percent t-butyl perbenzoate.
(2) Polymerized at 110° C. with 0.33 percent t-butyl perbenzoate.
(3) Polymerized at 110° C. with 0.33 percent t-butyl perbenzoate.
(4) Polymerized at 110° C. with 1.0 percent t-butyl perbenzoate.
(5) Polymerized at 110° C. with 0.75 percent t-butyl perbenzoate.
(6) Polymerized at 80° C. with 0.4 percent azo-di-isobutyronitrile.
(7) Polymerized at 80° C. with 0.4 percent azo-di-isobutyronitrile.
(8) Polymerized at 80° C. with 0.4 percent azo-di-isobutyronitrile.

The products prepared according to the methods of the present invention (Nos. 1–6) are compared with a commercial product (No. 7) composed of higher methacrylic acid esters and showing none of the dispersing effect of the improved lubricating oil additives. The next product (No. 8) contains 4% of copolymerized N-vinyl-2-pyrrolidone, but is otherwise of the same composition as No. 7.

In preparing the additives compared in Table 1, the components to be polymerized were in each case diluted with an equal amount of a paraffinic-naphthenic lubricating oil as a polymerization medium. The polymerization was carried out at 110° C. (with the use of a peroxide activator) or at 80° C. (with the use of an azo activator), and the starting material was in each case stirred for 8 hours under a carbon dioxide atmosphere. The product obtained was diluted with mineral oil to a solids content of 40%. 3 parts of this 40% mineral oil solution was added to the 100 parts by weight of lubricating oil to be improved (a mineral oil of SAE class 20W/20) so that the polymer content in the oil tested was 1.2% in all cases.

The determination of the V–I value is according to Zerbe, "Mineralöle und Verwandte Produkte," 1952, p. 34. The new products were tested in a diesel motor and in an Ottomotor for periods of 50 hours.

The stripe test was made according to the method of W. Wolf, "Motorische Untersuchungen von Kraftstoffe und Schmierölen" in "Mineralöl-Technik," May 1958, pages 36–40. This test was altered to make it more pertinent to the conditions prevailing in a motor in that a gasoline flame was projected into the oil to be tested, and the resulting combustion gases were thoroughly mixed with the cooled oil by continuous stirring. A test stripe which showed no deposit received a point value of "10," while a test stripe with heavy deposits was given a point grade of "1."

The spot test is that of Kadmer in "Mineralöl-Technik," November 1959, pages 15 et seq. The greater the diameter of the spot measured, the better is the dispersing effect of the lubricating oil additive.

The dispersion test was carried out according to the method described in British Patent 798,542, page 3.

The motor test was carried out on a test stand in an MWM one cylinder, four cycle, diesel KD12E motor according to the methods described and discussed in "Erdöl und Kohle," 159, pages 484, et seq.

TABLE 1

| Additive No. | VI Value | Stripe Test (points) | Spot Test (diam. in mm.) | Dispersion Test | Motor Test (points) |
|---|---|---|---|---|---|
| 1 | 128 | 9.0 | 23 | Homogeneous | 72.8 |
| 2 | 128 | 9.0 | 25 | do | 62.6 |
| 3 | 130 | 10.0 | 24 | do | 68.7 |
| 4 | 132 | 9.0 | 27 | do | 71.8 |
| 5 | 130 | 9.0 | 27 | do | |
| 6 | 128 | 9.0 | 25 | do | |
| 7 | 132 | 3.5 | 10 | Inhomogeneous | 58.0 |
| 8 | 130 | 6.0 | 14 | Homogeneous | 63.2 |

The values in Table I show that even with the incorporation of small amounts of bitumen in the polymeric compound, a clear improvement of the dispersing effect of the lubricating oil additive is apparent.

In some cases even the slight color imparted to an oil by the use of bitumen-containing polymers may be undesirable. It has now also been found that for such cases polymer additives with practically the same efficacy as those described earlier herein can be obtained by adding to the monomer or monomer mixture to be polymerized only that portion of bitumen which is soluble in ethyl acetate. By the extraction of a commercial bitumen with ethyl acetate and volatilization of the solvent, a bright yellow product whose chemical composition is not yet known is obtained. This product can be added in the manner described above to the monomers to be polymerized.

For example, 10 parts of such a bitumen extract were polymerized with 10 parts of methylmethacrylate and 80 parts of a mixture of higher methacrylic acid esters (12–18 carbon atoms in the alcohol component) at 105° C. in mineral oil (35 centistokes/100° F.) with 0.33 weight percent of t-butyl perbenzoate under a carbon dioxide atmosphere. The ratio of polymer and mineral oil was so chosen that a polymer solution containing 60% solids was obtained, which was then diluted to a polymer content of 40% with the same oil.

If 5% by weight of this polymer solution is added to an SAE 20W/20 mineral oil, a comparison of the improved oil with an additive-free oil gives the results shown in the following Table 2.

TABLE 2

| Test | SAE 20W/20 oil +5% additive | SAE 20W/20 oil, no additive |
|---|---|---|
| Settling time | 2 hours | Immediate. |
| Stripe test | 8.5–9 points | 3 points. |
| Spot test | 20 mm | 10 mm. |
| Amount of sludge removeable by centrifugation. | Less than 0.1% | 2–3%. |

Although the isolation of the effective bitumen component can be carried out in an especially simple fashion by extraction, for example with ethyl acetate, it can also be done in other ways, such as by fractional precipitation out of bitumen-containing solutions, or with the help of adsorption and subsequent desorption techniques. This invention also comprehends such processes for the separation of the active bitumen components from the dark-colored components.

Although specific embodiments have been shown and described herein, it is to be understood that they are illustrative, and are not limiting on the scope and spirit of the invention.

What is claimed is:

1. In the method of making lubricating and fuel oil additives by polymerizing acrylates of alcohols having from 8 to 18 carbon atoms, the improvement which comprises dissolving bitumen, as defined herein, in said acrylates prior to polymerization in amounts between 0.1 and 25 percent by weight of said additive, whereby products having improved dispersing properties are obtained.

2. The method as in claim 1 wherein said bitumen is dissolved in said acrylates with the aid of a solubilizing agent copolymerizeable with said acrylates.

3. The method as in claim 2 wherein said solubilizing agent is isobutylmethacrylate.

4. The method as in claim 1 wherein a polymerizable heterocyclic compound containing a basic tertiary amino nitrogen atom as a ring member is present in the acrylate-bitumen polymerization mixture.

5. The method as in claim 4 wherein said heterocyclic compound is N-vinyl-2 pyrrolidone.

6. In the method of making lubricating and fuel oil additives by polymerizing acrylates of alcohols having from 8 to 18 carbon atoms, the improvement which comprises dissolving that component of bitumen, as defined herein, which is soluble in ethyl acetate in said acrylates prior to polymerization in amounts between 0.1 and 25 percent by weight of said additive, whereby products having improved dispersing properties are obtained.

7. In the method of making lubricating and fuel oil additives by polymerizing acrylates of alcohols having from 8 to 18 carbon atoms, the improvement which comprises dissolving bitumen, as defined herein, in said acrylates prior to polymerization in amounts between 0.1 and 25 percent by weight of said additive in the additional presence of at least one monomer copolymerizable with said acrylate, said monomer being incorporated into said additive by polymerization, whereby products having improved dispersing properties are obtained.

8. The method as in claim 7 wherein said monomer is selected from the group consisting of styrene, ethyl acrylate, methylmethacrylate, methacrylamide, glycol monomethacrylate, acrylonitrile, and vinyl acetate.

9. The method as in claim 7 wherein said monomer is methylmethacrylate.

10. A product prepared as in claim 1.

11. A product prepared as in claim 6.

12. A product prepared as in claim 7.

References Cited by the Examiner

UNITED STATES PATENTS

| | | | |
|---|---|---|---|
| 2,404,268 | 7/1946 | Barnes | 260—86.1 |
| 2,420,082 | 5/1947 | Klinger | 260—28 |
| 2,497,705 | 2/1950 | Werntz | 260—88.3 |
| 2,545,963 | 3/1951 | Mack | 260—28.5 |
| 2,649,439 | 8/1953 | Brown | 260—86.1 |
| 2,655,479 | 10/1953 | Munday et al. | 252—26 |
| 2,816,882 | 12/1957 | Schiller | 260—86.1 |

OTHER REFERENCES

Ser. No. 383,057, Hendgen, (A.P.C.), published Apr. 20, 1943, and now abandoned.

MORRIS LIEBMAN, *Primary Examiner.*

ALPHONSO D. SULLIVAN *Examiner.*

J. ZIEGLER, J. A. GAZEWOOD, *Assistant Examiners.*